US012060857B2

(12) United States Patent
Shipp

(10) Patent No.: US 12,060,857 B2
(45) Date of Patent: Aug. 13, 2024

(54) EGR FLOW CONTROL DURING HIGH ENGINE PRESSURE DIFFERENTIAL CONDITIONS

(71) Applicant: Cummins Inc., Columbus, IN (US)

(72) Inventor: Timothy Shipp, Seymour, IN (US)

(73) Assignee: Cummins Inc., Columbus, IN (US)

( * ) Notice: Subject to any disclaimer, the term of this patent is extended or adjusted under 35 U.S.C. 154(b) by 6 days.

(21) Appl. No.: 17/815,615

(22) Filed: Jul. 28, 2022

(65) Prior Publication Data

US 2023/0094278 A1 Mar. 30, 2023

Related U.S. Application Data

(60) Provisional application No. 63/246,400, filed on Sep. 21, 2021.

(51) Int. Cl.
*F02M 26/02* (2016.01)
*F02M 26/45* (2016.01)
*F02M 26/52* (2016.01)

(52) U.S. Cl.
CPC ............ *F02M 26/02* (2016.02); *F02M 26/45* (2016.02); *F02M 26/52* (2016.02)

(58) Field of Classification Search
CPC .......... F02M 26/52; F02M 26/45; F02M 26/02
See application file for complete search history.

(56) References Cited

U.S. PATENT DOCUMENTS

| 6,422,219 B1 | 7/2002 | Savonen et al. |
| 8,505,281 B2 | 8/2013 | Guo et al. |
| 8,752,364 B2 | 6/2014 | Guo et al. |
| 9,181,905 B2 | 11/2015 | Chi et al. |
| 2003/0127077 A1* | 7/2003 | Sisken ................ F02M 26/50 123/568.11 |
| 2013/0080034 A1 | 3/2013 | Chi et al. |
| 2022/0341378 A1* | 10/2022 | Miles .................... F02M 26/28 |

FOREIGN PATENT DOCUMENTS

| WO | 2020002571 A1 | 1/2020 |
| WO | 2020120614 A2 | 6/2020 |
| WO | 2020221478 A1 | 11/2020 |

* cited by examiner

*Primary Examiner* — Kevin A Lathers
(74) *Attorney, Agent, or Firm* — Taft, Stettinius & Hollister LLP

(57) ABSTRACT

Systems, apparatus, and methods are disclosed that include an internal combustion engine having a plurality of cylinders and controlling a device to reduce the pressure in an exhaust gas recirculation loop in response to a pressure condition exceeding a threshold.

20 Claims, 2 Drawing Sheets

EGR FLOW CONTROL DURING HIGH ENGINE PRESSURE DIFFERENTIAL CONDITIONS

CROSS-REFERENCE TO RELATED APPLICATION

The present application claims the benefit of the filing date of U.S. Provisional Application Ser. No. 63/246,400 filed on Sep. 21, 2022, which is incorporated herein by reference.

FIELD OF THE INVENTION

This invention relates to internal combustion engines, and more particularly to controlling exhaust gas recirculation (EGR) flow in conjunction with high pressure differential conditions across internal combustion engines.

BACKGROUND

An internal combustion engine can be operated in a manner that improves thermal management of aftertreatment components, such as a selective catalytic reduction (SCR) catalyst. One technique for thermal management includes creating a back-pressure in the exhaust system, such as by over-closing an inlet of a variable geometry turbine or closing an exhaust throttle. These techniques have the benefit of maintaining the SCR catalyst and other exhaust components in a desired temperature range during operation so their efficiency is maintained for NOx reduction. However, they also can create conditions in which the exhaust manifold pressure is significantly higher than the inlet manifold pressure. During these conditions, exhaust gas recirculation (EGR) flow is difficult to control due to the high pressure differential across the EGR valve, and EGR flow may be terminated as a result of the lack of control. The resulting cooler intake flow created by stopping EGR flow may cause an increase in NOx output from the engine over what would be provided if EGR flow were able to be maintained during these conditions. Therefore, further improvements are needed in this area.

SUMMARY

Embodiments include unique systems, apparatus, and methods that include a multi-cylinder internal combustion engine that includes an EGR system and is configured to operate with elevated exhaust manifold pressures, such as by closing an exhaust throttle and/or overclosing an inlet to a VGT. In one embodiment, the EGR system includes a pressure reducing device in the EGR system that regulates EGR flow pressure in response to an exhaust manifold pressure condition that would otherwise inhibit EGR flow without the pressure reducing device. In an embodiment, a controller may be configured to receive one or more inputs associated with a pressure differential across the engine, and to control operation of the pressure reducing device in the EGR system to maintain the EGR flow in response to the pressure differential.

In an embodiment, the pressure reducing device extracts work from the EGR flow to reduce the pressure in the EGR system so that an EGR valve downstream of the pressure reducing device is better able to control the EGR flow. In an embodiment, the pressure reducing device is a pressure ratio device. In an embodiment, the pressure reducing device is a Roots-type blower. In an embodiment, the pressure reducing device is a blower. In an embodiment, the pressure reducing device is a turbine. In an embodiment, the pressure reducing device is connected to an electrical device, such as a motor and/or a generator, to convert the energy in the EGR flow to electrical energy.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

DESCRIPTION OF ILLUSTRATIVE EMBODIMENTS

Figure 1:
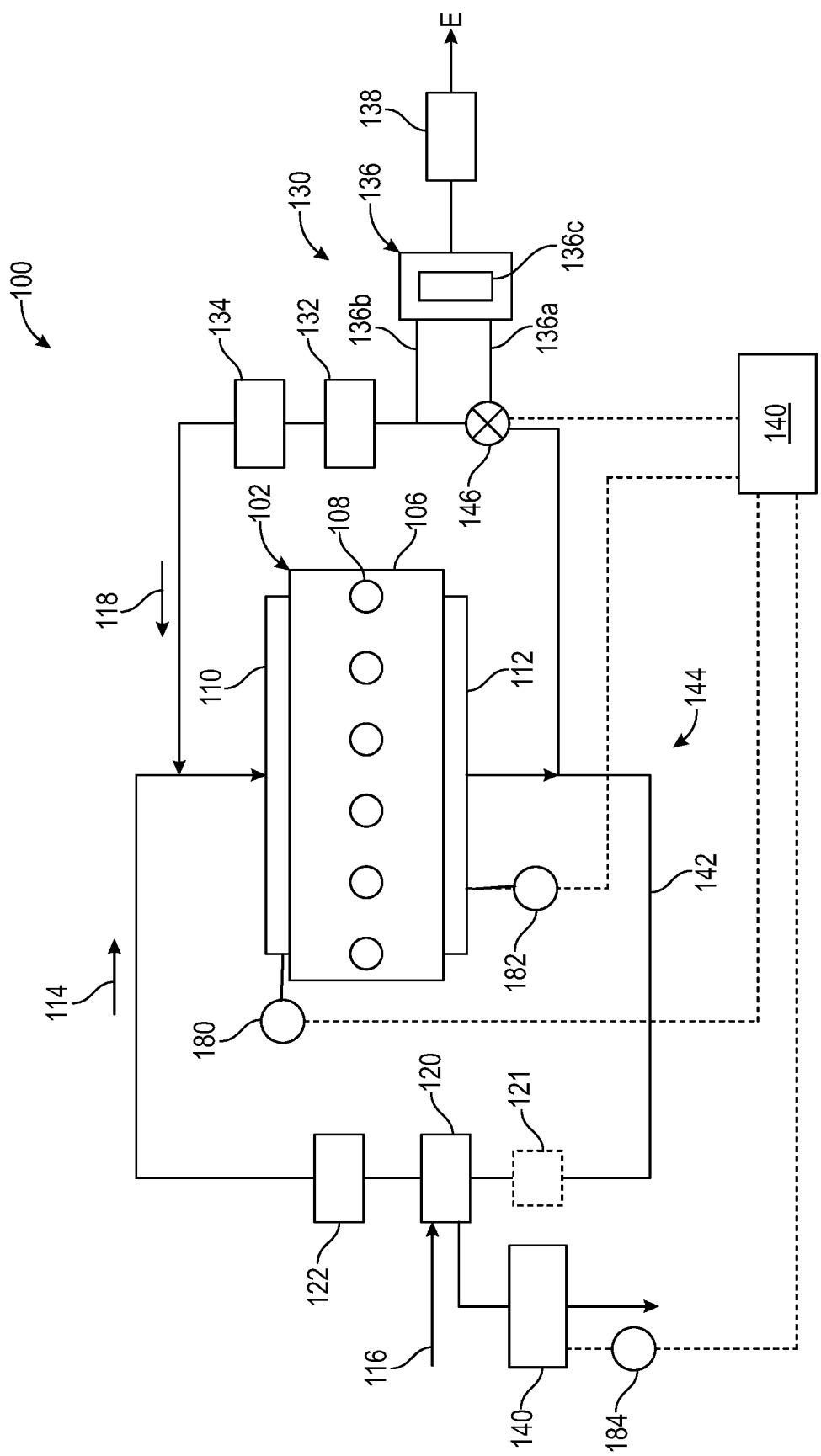
FIG. 1 is a schematic depiction of one embodiment of an internal combustion engine system including an EGR pressure reducing device.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Referring to FIG. 1, a system 100 includes an engine 102 fluidly coupled to an aftertreatment system 104. The system 100 may further includes a transmission (not shown) coupled to the engine 102, which may be a part of a powertrain for propelling a vehicle driven by engine 102 via wheels. Other embodiments contemplate that system 100 is a marine application, locomotive application, part of a genset for powering a generator, or other motive or non-motive application. The engine 102 may be any type of internal combustion engine capable of operating with a Miller cycle, including at least a diesel, gasoline, natural gas engine, and/or combinations thereof.

In certain embodiments, the engine 102 includes a lean combustion engine such as a lean burn gasoline engine or a diesel cycle engine. In certain embodiments, the engine 102 may be any engine type producing emissions that may include an exhaust gas recirculation (EGR) system 130, for example to reduce $NO_x$ emissions from the engine 102. In the illustrated embodiment of FIG. 1, the system 100 includes an engine 102 having an in-line 6-cylinder arrangement for illustration purposes. However, V-shaped arrangements and other any number of cylinders with V-shaped arrangements, multiple cylinder bank arrangements, and other in-line arrangements are also contemplated.

A typical multi-cylinder engine 102 has an engine block 106 with multiple cylinders 108 each with a combustion chamber housing a piston that is operably attached to a crankshaft (not shown.) There is also at least one intake valve (not shown) and at least one exhaust valve (not shown) that allow passage of air into and out of each cylinder 108 from an intake manifold 110 to an exhaust manifold 112. A fuel injector (not shown) can provide fuel directly to the combustion chamber, by port injection, and/or by injection in the intake system, upstream of combustion chamber. The typical engine 102 operates on a four-stroke cycle that sequentially includes an air intake stroke, a compression stroke, a power stroke, and an exhaust stroke for the piston of each cylinder. As used herein, one cycle of the cylinder 108 or engine 102 occurs at the completion of these four strokes.

The ambient air flow 116 provides intake air that flows through intake manifold 110 before reaching the intake valves of the cylinders 108. The intake passage may be connected to a compressor of a VGT 120 or other turbine, a charge air cooler (CAC) 122, and an optional intake air throttle (not shown). The intake air can be purified by an air cleaner (not shown), compressed by the compressor, and then aspirated into the combustion chambers of the cylinders 108.

The exhaust gas flows out from the combustion chambers into an exhaust system 144 that includes an exhaust passage 142 extending from exhaust manifold 112. The exhaust passage 142 is connected to a turbine of VGT 120 and to the EGR system 130. Exhaust gas from the turbine of VGT 120 then flows into aftertreatment system 104 that includes one or more aftertreatment devices. The aftertreatment system 104 may include any type of aftertreatment components known in the art, including catalytic and/or filtration components. Example aftertreatment components may include, without limitation, oxidation catalysts (e.g., a diesel oxidation catalyst ("DOC"), $NO_x$ treatment components (e.g., three-way catalyst, lean NOx catalyst, SCR catalyst, etc.), a filtration component (either catalyzed or uncatalyzed, e.g., a diesel particulate filter ("DPF"), and a cleanup catalyst (e.g., an ammonia oxidation catalyst).

The system 100 in the illustrated embodiment includes VGT 120 connected to exhaust manifold 112. Other embodiments contemplate an exhaust throttle 121 downstream of a turbine that is wastegated, or an exhaust throttle 121 employed without a turbine. The VGT 120 may include movable vanes, but the VGT 120 can also be a variable nozzle turbine having a movable wall instead of movable vanes. VGT 120 includes a turbine that receives exhaust flow and a compressor that receives ambient air flow 116. The compressor compresses the ambient air and provides it to CAC 122 which is connected to intake manifold 110 to provide an intake flow 114.

The exhaust manifold 112 is also connected to EGR system 130 that includes an EGR loop with an EGR valve 132, an EGR cooler 134 that may or may not include a bypass, and a pressure reducing device 136 upstream of EGR valve 132. EGR system 130 is operable to provide an EGR flow 118 that combines with an intake flow at a position upstream of intake manifold 110. Intake manifold 110 provides a charge flow including the intake flow and, if provided, the EGR flow to cylinders 108.

System 100 further includes a fuel system (not shown) that is operable to provide fuel from a fuel storage source, such as a fuel tank, to cylinders 108. A plurality of fuel injectors can be provided, at least one per cylinder, to inject fuel into each cylinder 108 in response to a fueling command from a controller 140. It should be understood that any suitable fuel system is contemplated.

In operation, the VGT 120 and/or exhaust valve 121 may be opened and/or closed in response to a thermal management condition of one or more components in aftertreatment system 104, such as an SCR catalyst. This creates a higher exhaust manifold pressure, and therefore a higher pressure differential between the intake system/intake manifold 110 and the exhaust system/exhaust manifold 112. As a result, EGR flow 118 is difficult to control due to the large pressure drop across the EGR valve 132. In response to the pressure condition created by over-closing the VGT 120 and exhaust valve, the pressure reducing device 136 can be operated to reduce the pressure upstream of the EGR valve 132, improving controllability of the EGR flow 118 during the thermal management operating condition. NOx reduction during the thermal management operating condition is thus improved since EGR flow 118 is able to be maintained.

In addition, the pressure reducing device 136 can be connected to an electrical device 138, such as a motor or a generator (or combination thereof) to harvest the energy in the EGR flow as electrical energy E, improving CO2 performance of the system 100. As discussed above, pressure reducing device 136 can be one or more of a pressure ratio device, a blower, a Roots-type blower, an EGR pump, or a turbine. Pressure reducing device 136 includes an inlet 136a, an outlet 136b, and a wheel 136c with blades or other energy extractor therebetween that extracts energy from the EGR flow so that the pressure drop across the EGR valve 132 is reduced.

The controller 140 is connected to a plurality of sensors shown schematically as sensors 180, 182, 184. The sensors may be physical or virtual sensors and include, but are not limited to, an intake manifold pressure sensor 180 to detect, estimate, or sense intake manifold pressure; an exhaust manifold pressure sensor 182 to detect, estimate, or sense exhaust manifold pressure; and aftertreatment sensor or sensors 184 to detect, estimate or sense aftertreatment conditions such as temperature, pressure, performance, exhaust constituents, loading, etc. Sensors may also be provided for in-cylinder conditions, vehicle speed, vehicle acceleration, engine position, engine speed, mass air flow into the manifold, engine temperature, air temperature barometric pressure, EGR amount, VGT position, torque demand, gear position, etc.

In certain embodiments, the controller 140 is structured or configured to perform certain operations to control operations of engine 102. In certain embodiments, the controller 140 forms a portion of a processing subsystem including one or more computing devices having memory, processing, and communication hardware. The controller 140 may be a single device or a distributed device, and the functions of the controller 140 may be performed by hardware or software. The controller 140 may be included within, partially included within, or completely separated from an engine controller (not shown). The controller 140 is in communication with any sensor or actuator throughout the system 100, including through direct communication, communication over a datalink, and/or through communication with other controllers or portions of the processing subsystem that provide sensor and/or actuator information to the controller 140.

In certain embodiments, the controller 140 is described as functionally executing certain operations. The descriptions herein including the controller operations emphasizes the structural independence of the controller, and illustrates one grouping of operations and responsibilities of the controller. Other groupings that execute similar overall operations are understood within the scope of the present application. Aspects of the controller may be implemented in hardware and/or by a computer executing instructions stored in non-transient memory on one or more computer readable media, and the controller may be distributed across various hardware or computer based components.

Example and non-limiting controller implementation elements include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), and/or digital control elements.

The listing herein of specific implementation elements is not limiting, and any implementation element for any controller described herein that would be understood by one of skill in the art is contemplated herein. The controller or controllers herein, once the operations are described, are capable of numerous hardware and/or computer based implementations, many of the specific implementations of which involve mechanical steps for one of skill in the art having the benefit of the disclosures herein and the understanding of the operations of the controllers provided by the present disclosure.

Certain operations described herein include operations to interpret or determine one or more parameters. Interpreting or determining, as utilized herein, includes receiving values by any method known in the art, including at least receiving values from a datalink or network communication, receiving an electronic signal (e.g. a voltage, frequency, current, or PWM signal) indicative of the value, receiving a software parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Certain systems are described following, and include examples of controller operations in various contexts of the present disclosure. The operation of the engine 102, VGT 120, pressure reducing device 136 is controlled by the controller 140 in response to engine and/or aftertreatment operating conditions sensed by the sensors represented by sensor(s) 180, 182, 184. In certain embodiments, the controller 140 interprets or determines a thermal management condition for aftertreatment system 104, and in response thereto commands the VGT 120 to overclose and/or exhaust throttle 121 to close, to increase the engine output temperature and thereby increasing the exhaust manifold pressure relative to the intake manifold pressure. As a result, the pressure differential across engine 102 increase, inhibiting EGR flow 118 from EGR system 130.

Figure 2:
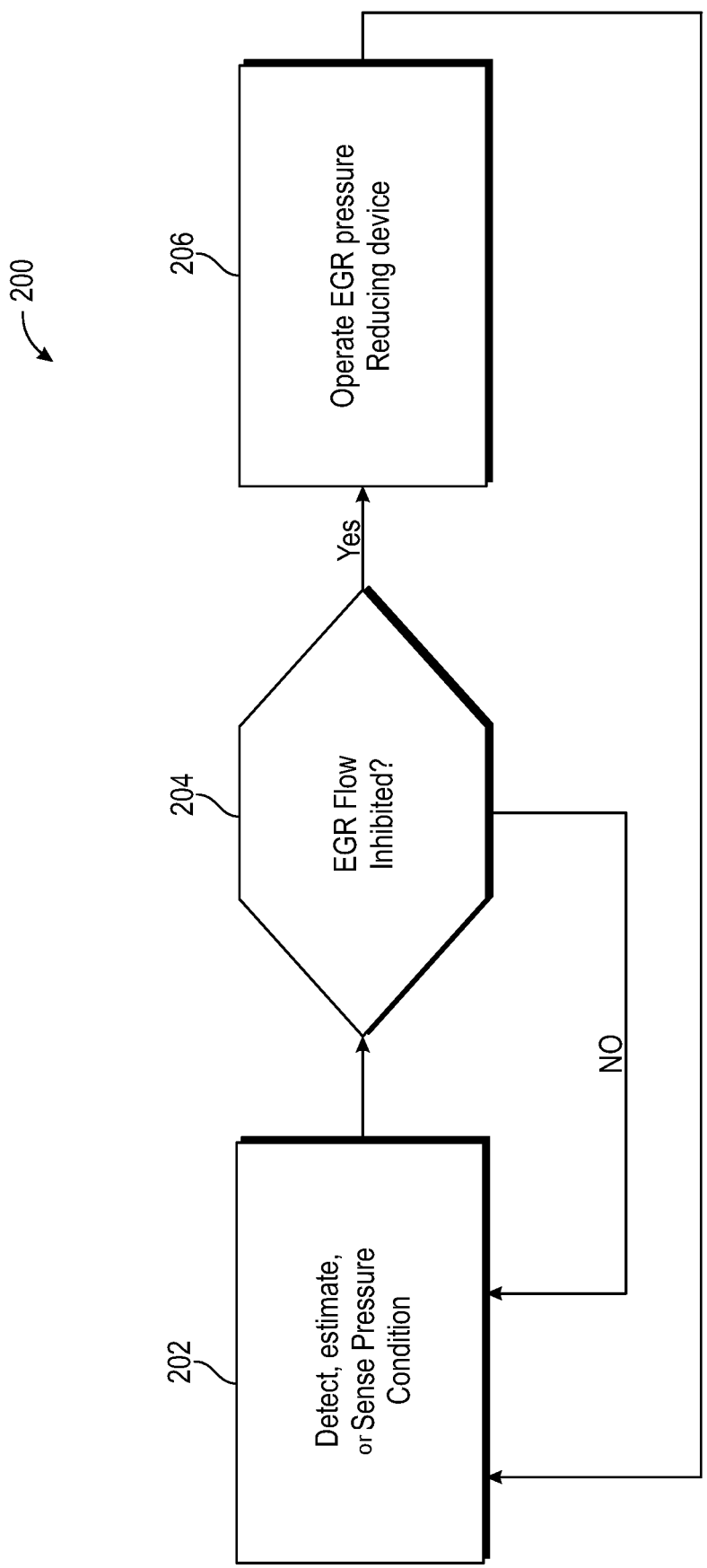
FIG. 2 is a flow diagram of a procedure for operation of the system of FIG. 1 in response to an exhaust manifold pressure condition.

Referring now to FIG. 2, there is shown a procedure 200 for operating system 100. Procedure 200 includes an operation 202 to detect, estimate, sense, or otherwise determine a pressure condition associated with operation of system 100. As discussed above, in an embodiment, a pressure condition can result due to overclosing VGT 120 and/or closing exhaust throttle 121 in response to a thermal management condition of aftertreatment system 104. Other embodiments contemplate determination of a pressure condition or conditions caused by other engine system operations that inhibit EGR flow control.

Procedure 200 continues at a conditional 204 to determine if EGR flow 118 is inhibited in response to the pressure condition determined at operation 202. Determining if the EGR flow 118 is inhibited can include, for example, determining a pressure differential between the exhaust system and the intake system, and/or between the exhaust manifold 112 and intake manifold 110, exceeds a threshold pressure differential. The threshold pressure differential can be, for example, indicative of an inability to control the EGR flow 118 through EGR valve 132. Other embodiments contemplate other techniques for determining that EGR flow 118 is inhibited, such as by determining a differential pressure across the EGR valve 132, or determining an exhaust system pressure, exceeds a threshold amount. If conditional 204 is NO, procedure 200 returns to operation 202. If conditional 204 is YES, procedure 200 continues at operation 206.

Procedure 200 continues at operation 206 to operate the EGR pressure reducing device 136. In one embodiment, operation 206 can include opening a control valve 146 to bypass all or a portion of the EGR flow to pressure reducing device 136. The pressure reducing device 136 reduces the EGR flow pressure upstream of EGR valve 132 so that the EGR flow 118 is controllable. As discussed above, pressure reducing device 136 may be connected to an electrical device 138 to provide an electrical output for use or storage by the system 100.

Various aspects of the present disclosure are contemplated as indicated in the present disclosure and in the claims that follow. In one aspect, a system includes an internal combustion including an intake manifold and a plurality of cylinders, and each of the cylinders includes at least one intake valve and at least one exhaust valve. The system also includes an intake system for providing a charge flow to the plurality of cylinders and an exhaust system for receiving an exhaust flow from the plurality of cylinders. An EGR system connects the exhaust system and the intake system to provide an EGR flow, and one or more devices are provided in the EGR system to reduce a pressure in the EGR system. The system includes a controller operably connected with the one or more devices. The controller is configured to determine a pressure condition that inhibits EGR flow from the EGR system, and, in response to the pressure condition, operate the one or more devices for reducing the pressure in the EGR system to provide EGR flow during the pressure condition.

In an embodiment, the pressure condition is a pressure differential between the exhaust system and the intake system exceeding a threshold pressure differential. In a refinement of this embodiment, the pressure differential is between an exhaust manifold and an intake manifold of the internal combustion engine.

In an embodiment, the pressure condition is created by over-closing a variable geometry turbine in the exhaust system. In a refinement of this embodiment, the EGR system is a high pressure EGR system located upstream of the variable geometry turbine.

In an embodiment, the pressure condition is created by closing an exhaust throttle in the exhaust system. In an embodiment, the EGR system includes an EGR valve downstream of the one or more devices.

In an embodiment, the one or more devices includes a blower. In a refinement of this embodiment, the blower is a Roots-type blower. In an embodiment, the one or more devices includes a turbine. In an embodiment, the one or more devices is connected to an electrical device to convert energy in the EGR flow to electrical energy.

In another aspect, a method for operating an internal combustion engine that includes a plurality of cylinders connected to an intake system and an exhaust system. The method includes determining a pressure condition associated with operation of the internal combustion engine; and in response to the pressure condition, reducing a pressure in an EGR loop of the internal combustion engine to provide EGR flow to the intake system during the pressure condition.

In an embodiment, reducing the pressure in the EGR loop includes extracting energy from the EGR loop and converting the extracted energy into electricity. In an embodiment, reducing the pressure in the EGR loop includes operating a blower in the EGR loop. In an embodiment, reducing the pressure in the EGR loop includes operating a turbine in the EGR loop.

In an embodiment, the method includes closing a variable geometry turbine in the exhaust system before determining the pressure condition. In an embodiment, the method includes closing an exhaust throttle in the exhaust system before determining the pressure condition.

In an embodiment, the pressure condition is a pressure differential between the exhaust system and the intake system exceeding a threshold pressure differential. In an embodiment, the pressure condition is a pressure differential between an exhaust manifold and an intake manifold of the internal combustion engine.

In another aspect, an apparatus includes a controller for an internal combustion. The internal combustion engine includes an exhaust system and an intake system. The controller is configured to determine a pressure condition associated with operation of the internal combustion engine, and, in response to the pressure condition, reduce a pressure in an EGR loop of the internal combustion engine to provide EGR flow to the intake system during the pressure condition.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system comprising:
   an internal combustion engine including an intake manifold and a plurality of cylinders, each of the cylinders including at least one intake valve and at least one exhaust valve;
   an intake system for providing a charge flow to the plurality of cylinders;
   an exhaust system for receiving an exhaust flow from the plurality of cylinders;
   an exhaust gas recirculation (EGR) system connecting the exhaust system and the intake system to provide an EGR flow;
   a pressure reducing device including a blower, an EGR pump, a turbine, or a wheel configured to extract energy from the EGR flow to reduce a pressure differential in the EGR system; and
   a controller operably connected with the one or more devices, wherein the controller is configured to:
      receive at least one pressure input associated with at least the exhaust system;
      determine a pressure condition in response to the at least one pressure input, the pressure condition inhibiting control of EGR flow from the EGR system; and
      in response to the pressure condition, operate the pressure reducing device to extract energy from the EGR flow to reduce the pressure differential in the EGR system and increase control of EGR flow during the pressure condition.

2. The system of claim 1, wherein the pressure condition is a pressure differential between the exhaust system and the intake system exceeding a threshold pressure differential.

3. The system of claim 2, wherein the pressure differential is between an exhaust manifold and an intake manifold of the internal combustion engine.

4. The system of claim 1, wherein the pressure condition is created by over-closing a variable geometry turbine in the exhaust system.

5. The system of claim 4, wherein the EGR system is a high pressure EGR system located upstream of the variable geometry turbine.

6. The system of claim 1, wherein the pressure condition is created by closing an exhaust throttle in the exhaust system.

7. The system of claim 1, wherein the pressure reducing device is a blower.

8. The system of claim 7, wherein the blower is a Roots-type blower.

9. The system of claim 1, wherein the pressure reducing device is a turbine.

10. The system of claim 1, wherein the pressure reducing device is connected to an electrical device to convert the energy extracted from the EGR flow to electrical energy.

11. The system of claim 1, wherein the EGR system includes an EGR valve downstream of the pressure reducing device, and the pressure reducing device reduces the pressure differential across the EGR valve.

12. A method for operating an internal combustion engine, the method comprising:
   determining a pressure condition associated with operation of the internal combustion engine, the internal combustion engine including a plurality of cylinders connected to an intake system and an exhaust system, wherein the pressure condition inhibits control of exhaust gas recirculation (EGR) flow through an EGR loop of the internal combustion engine;
   in response to the pressure condition, extracting energy from the EGR flow to reduce a pressure differential in the EGR loop of the internal combustion engine and increase control of EGR flow to the intake system during the pressure condition.

13. The method of claim 12, further comprising converting the extracted energy into electricity.

14. The method of claim 12, wherein reducing the pressure differential in the EGR loop includes operating a blower in the EGR loop.

15. The method of claim 12, wherein reducing the pressure differential in the EGR loop includes operating a turbine in the EGR loop.

16. The method of claim 12, further comprising closing a variable geometry turbine in the exhaust system before determining the pressure condition.

17. The method of claim 12, further comprising closing an exhaust throttle in the exhaust system before determining the pressure condition.

18. The method of claim 12, wherein the pressure condition is a pressure differential between the exhaust system and the intake system exceeding a threshold pressure differential.

19. The method of claim 12, wherein the pressure condition is a pressure differential between an exhaust manifold and an intake manifold of the internal combustion engine.

20. An apparatus, comprising:
- a controller for an internal combustion, the internal combustion engine including an exhaust system and an intake system, wherein the controller is configured to:
    - receive at least one pressure input associated with at least the exhaust system;
    - determine a pressure condition associated with operation of the internal combustion engine in response to the at least one pressure input, wherein the pressure condition inhibits control of exhaust gas recirculation (EGR) flow through an EGR loop of the internal combustion engine; and
    - in response to the pressure condition, extract energy from the EGR flow with a blower, a turbine, or a wheel of a pressure reducing device to reduce a pressure in the EGR loop of the internal combustion engine and increase control of the EGR flow to the intake system during the pressure condition.

* * * * *